United States Patent [19]

Breen

[11] 4,034,961
[45] July 12, 1977

[54] DRIVE-ON VEHICLE LEVELING DEVICE

[76] Inventor: Kenneth J. Breen, 5118 Mayview Road, Lyndhurst, Ohio 44124

[21] Appl. No.: 706,442

[22] Filed: July 19, 1976

Related U.S. Application Data

[63] Continuation-in-part of Ser. No. 495,779, Aug. 8, 1974, abandoned, which is a continuation-in-part of Ser. No. 360,934, May 16, 1973, abandoned.

[51] Int. Cl.² .................................... F16M 13/00
[52] U.S. Cl. .................................... 254/94; 188/32
[58] Field of Search ................ 254/88, 94; 188/32, 188/36; 248/352, 188.2

[56] References Cited

U.S. PATENT DOCUMENTS

| 1,947,346 | 2/1934 | Lintern | 254/94 |
| 1,996,612 | 4/1935 | Cook | 254/94 |
| 2,712,432 | 7/1955 | Thornton | 254/88 |
| 3,065,680 | 11/1962 | Wiedman | 188/32 |
| 3,298,665 | 1/1967 | Sieloff | 254/94 |
| 3,661,229 | 5/1972 | Stonhaus | 188/32 |
| 3,664,466 | 5/1972 | Rothelsen | 188/32 |
| 3,684,233 | 8/1972 | Vukich | 248/352 |
| 3,770,323 | 11/1973 | Isaacson | 254/94 |

FOREIGN PATENT DOCUMENTS

| 18,601 | 8/1912 | United Kingdom | 254/94 |

*Primary Examiner*—Al Lawrence Smith
*Assistant Examiner*—Robert C. Watson
*Attorney, Agent, or Firm*—David A. Burge Co.

[57] ABSTRACT

A drive-on rockable leveling device for elevating a vehicle wheel has an arcuate drive-on surface which intersects an arcuate ground-engaging surface to form a blunt-pointed forward end. The drive-on surface preferably has a radius of curvature which is substantially equal to or slightly greater than that of the wheel to be elevated, thereby maximizing the surface area of engagement between the wheel and the leveling device. The ground-engaging surface has a radius of curvature which is substantially less than that of the drive-on surface to provide a rapid rocking action which will effectively reduce the angle of ramp inclination seen by a wheel supported atop the leveler. Spaced traction lugs are provided along the drive-on surface and along the ground-engaging surface. A wedge-shaped retaining block has an upper surface configured to mate with the ground-engaging surface of the leveler to positively retain the leveler in place once a wheel is supported atop the leveler. The retaining block can be used separately as a wheel chock.

18 Claims, 12 Drawing Figures

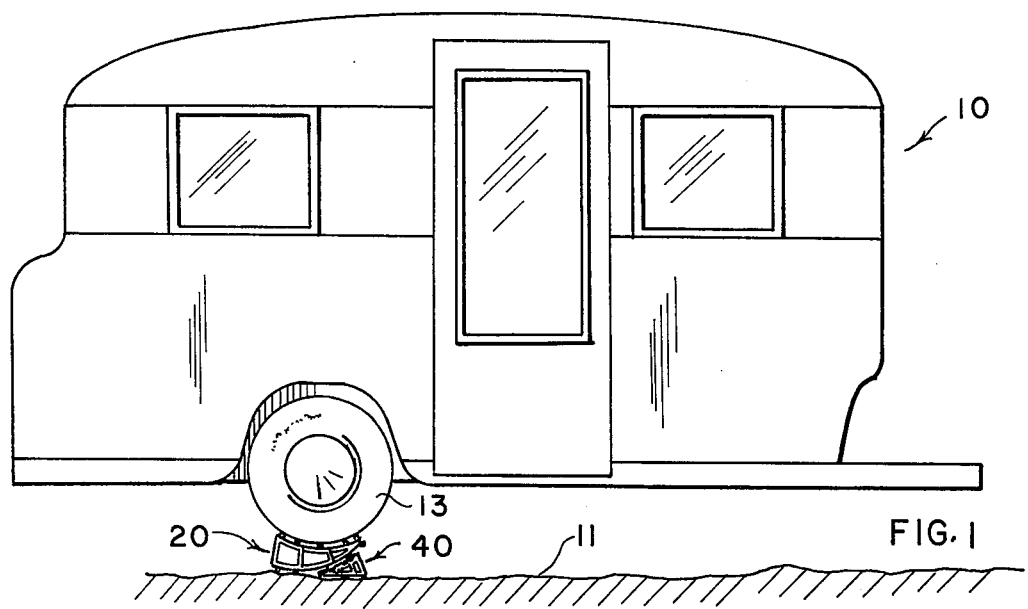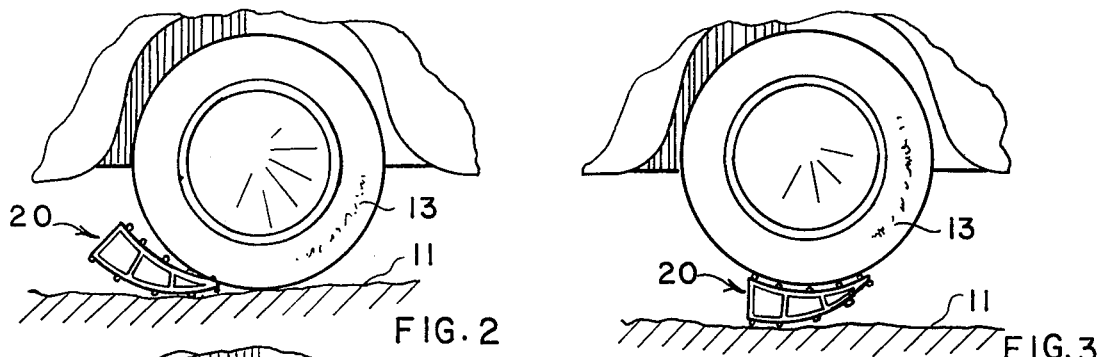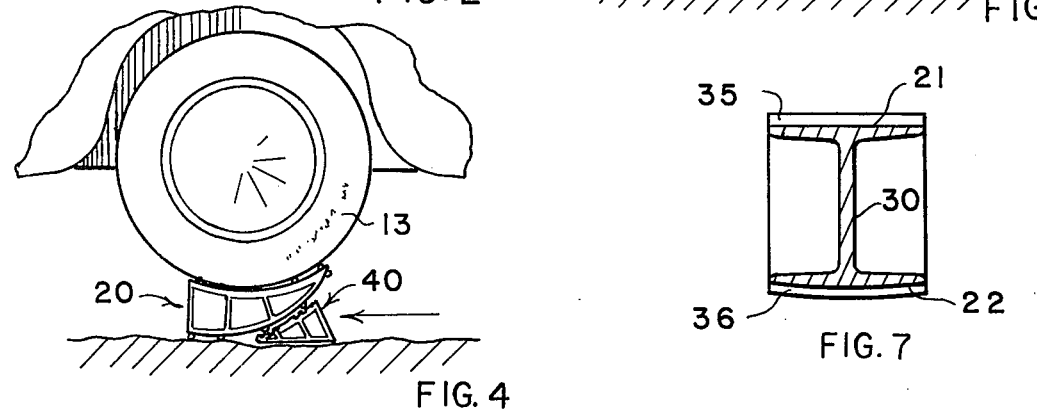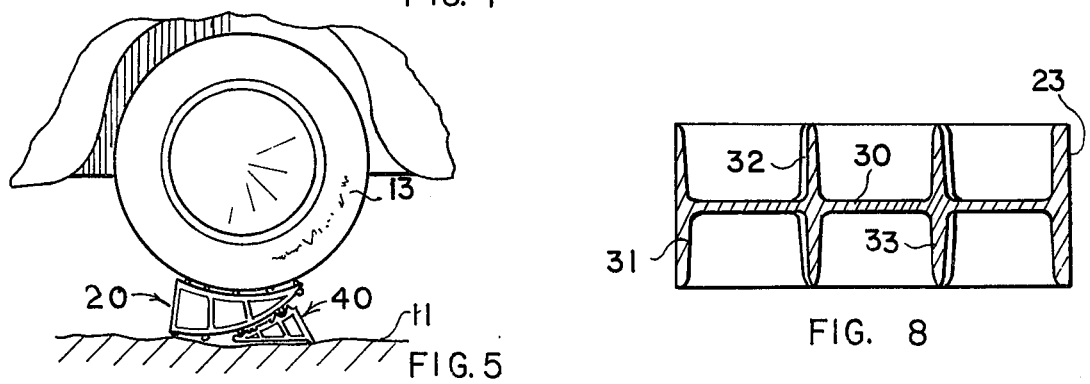

DRIVE-ON VEHICLE LEVELING DEVICE

CROSS REFERENCE TO RELATED APPLICATION

The present application is a continuation-in-part of a parent application Ser. No. 495,779 filed Aug. 8, 1974, now abandoned, which parent application was a continuation-in-part of an earlier application, Ser. No. 360,934 filed May 16, 1973, now abandoned, the disclosures of which are incorporated by reference.

BACKGROUND OF THE INVENTION

1. Field of the Invention

The present invention relates to a drive-on rockable vehicle leveling device for raising a vehicle wheel and retaining it in an elevated attitude.

2. Prior Art

A need has long existed for a safe, reliable drive-on wheel elevating device which can be used in uneven, moist or frozen terrain to raise a selected vehicle wheel and retain it in an elevated attitude.

A present day need for such a device stems from the increasingly popular use of camper trailers and self-propelled camper vehicles. It is desirable that these vehicles be leveled when they are parked for a night's camping, both for the comfort of the occupants and to permit proper operation of gravity fed fluid dispensers and other appliances. Many of these vehicles are heavy and when loaded with equipment, personal belongings and people, impose heavy loads on their supporting wheels. The vehicles are often parked overnight in designated rented areas having an uneven terrain. The ground may well be wet or frozen, which conditions make it difficult to safely level the vehicle.

While at least one rockable leveling device has been proposed for use with camper vehicles, it is not well adapted for use on wet or frozen ground surfaces. The leveling device is not provided with lugs for gripping a vehicle wheel or the ground, and is configured such that it presents a relatively steeply inclined surface to a wheel positioned atop the leveler. As a result, the leveler tends to slip out of place both during the procedure of driving a wheel into position atop the leveling device, and after the wheel is atop the leveler. A significant disadvantage of this proposed leveling device is its relatively long length. In experiments conducted with a conventional vehicle, the device was found to wedge itself against the underside of the vehicle's body as one of the vehicle's wheels was driven onto it. The extensive length of the proposed device prevents its being used between tandem wheels and requires that the vehicle move a substantial distance in driving onto the device. The relatively long length of the proposed leveler device results in a relatively heavy, relatively awkward to handle leveler.

Most known rockable leveling devices utilize a ground-engaging surface which has a radius of curvature that is substantially greater than the radius of the wheel to be elevated. This results in a slow rocking action of the leveling device. The rocking action is so slow as to lag behind the movement of the wheel, thereby necessitating that the wheel roll along the drive-on surface a substantial distance to lock the ramp into position. The vehicle must accordingly be moved through a lengthy distance to effect wheel elevation, and the leveling device must either be of excessive length or designed such that when the wheel comes to rest in its fully elevated position, the wheel is parked on a steeply inclined surface.

Prior drive-on rockable levelers typically have drive-on surfaces with radii of curvature that are substantially greater than the radius of the wheel to be elevated. The larger the radius of curvature of the drive-on surface, the less surface contact it will make with the wheel. When a moist or mud-laden wheel is parked on the inclined drive-on surface of such a leveling device, the wheel can slip down the inclined surface jolting the vehicle and, in some instances, propelling the leveling device from beneath the vehicle.

Other proposed levelers have eliminated the drive-on surface and either substituted a two-point contact with the wheel, or provided a boulder-like appliance which must be strapped to the vehicle wheel to prevent slippage as the wheel is rolled to a position atop the appliance. A two-point wheel contact at opposite ends of a rockable jacking device is not practicable for use with heavy present day camper vehicles as it resuls in unduly high stresses on the jacking device. Strap-on jacking devices are also inconvenient and impractical for use in muddy terrain.

SUMMARY OF THE INVENTION

The present invention overcomes the foregoing and other drawbacks of the prior art and provides a drive-on leveling device and a safety retaining block which are operable together to safely elevate a vehicle wheel and hold it in an elevated position.

The leveler is a ramp like structure having a curved supporting or "ground-engaging surface" and a curved drive-on or "wheel-engaging surface". These curved surfaces are arcuate and intersect near one end region of the leveler to form a blunt-pointed forward end. From the forware end, the two arcuate surfaces diverge to provide a rockable ramp. An end wall extends between the divergent surfaces defining the rearward end of the leveling device.

Several structural improvements in the leveler operate together to improve the safety and reliability of its operation. To begin with, the arcuate ground-engaging surface has a radius of curvature that is substantially less than the radius of curvature of the drive-on surface. In the preferred embodiment, the radius of curvature of the ground-engaging surface is between about 0.65 and 0.85 that of the wheel-engaging surface. This assures that the leveling device will rock rapidly as a wheel is driven into an elevated position atop the leveling device. It brings the center of radius of the wheel as rapidly as possible to a position near the center or radius of the ground-engaging surface to minimize slippage and to assure a stable posture when the wheel is fully elevated.

In the preferred embodiment the radius of curvature of the drive-on surface is substantially equal to or slightly greater than that of the wheel to be elevated. By this arrangement, the area of contact between the wheel and the drive-on surface is maximized to reduce slippage. Once the wheel comes into full driving engagement with the drive-on surface, this contact is maintained.

The "fully elevated height" to which the leveler will elevate a wheel is reached when a wheel driven onto the leveler has rocked the leveler to a position where the forward and rearward ends of the leveler are at approximately the same height. When the fully elevated height is reached, the elevated wheel is seated in an arcuate depression defined by the drive-on surface of the leveler.

The fully elevated height is a function of the length of the drive-on surface of the leveler together with the angle of intersection between the arcuate ground-engaging and wheel-engaging surfaces. In the preferred embodiment, this angle is selected such that the fully elevated height provided by the leveler is about one-third the length of the drive on surface. A 12 inch long leveler will accordingly elevate a wheel about 4 inches. Where the ground-engaging surface has a radius of curvature of about 0.65 to 0.85 that of the drive-on surface, and where the drive-on surface has a radius of curvature equal to or slightly greater than the radius of a wheel to be elevated, the leveler is operable to elevate the wheel by a factor of between about 0.20 and 0.40 of the wheel radius as the wheel rotates through less than a quarter revolution.

The drive-on and ground engaging surfaces are provided with spaced ribs or lugs. The lugs on the drive-on surface cause a tire in engagement with the drive-on surface to deform around and frictionally engage the lugs to minimize tire slippage. The lugs on the ground-engaging surface serve dual functions. In one capacity they positively engage a ground surface to minimize slippage of the leveling device while a wheel is initially driven onto it, while the wheel is in place atop it, and while the wheel is descending from it. In another capacity, the lugs cooperate with a retaining block to help lock the leveler in one of its elevated positions.

The retaining block is a wedge-shaped structure preferably molded from plastic. An inclined surface formed on the retaining block has a curvature to match the ground-engaging surface of the leveler, and has spaced depressions to mate with the lugs formed on the ground-engaging surface of the leveler. Several sets of spaced depressions are preferably provided on the inclined surface to enable the retaining block to be used when the leveler is at various elevated attitudes including the fully elevated position.

Positioning the retaining block for use with the leveler is effected after the wheel to be elevated is atop the leveler. The wheel is preferably driven onto the leveler slightly beyond the position where the leveler has rocked to a desired attitude.

The retaining block is then positioned beneath the forward end of the leveler with one set of its spaced depressions in engagement with the spaced lugs on the ground-engaging surface of the leveler. The wheel is then rotated slightly in the opposite direction to seat the leveler on the retaining block. Removing the retaining block is a simple matter of reversing these steps.

A feature of the retaining block is its capacity for use separately as a wheel chock.

It is a general object to provide a novel and improved vehicle leveling device which can be used safely and reliably to raise and retain a vehicle wheel in an elevated attitude.

Other objects and a fuller understanding of the invention may be had by referring to the following description and claims taken in conjunction with the accompanying drawings.

BRIEF DESCRIPTION OF THE DRAWINGS

FIG. 1 is a side elevational view of a vehicle with one wheel elevated by the leveling device and retaining block of the present invention;

FIGS. 2, 3, 4 and 5 are enlarged side elevational views illustrating in sequence the procedure of raising and retaining a vehicle wheel in an elevated attitude using the leveler and retaining block;

FIGS. 7 an 8 are enlarged cross-sectional views as seen from the planes indicated by th lins 7—7 and 8—8 in FIG. 6;

DESCRIPTION OF THE PREFERRED EMBODIMENT

Figure 6:
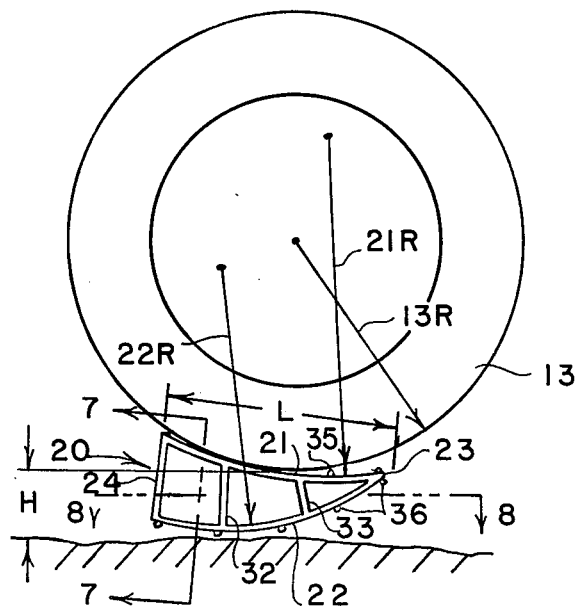
FIG. 6 is an enlarged side elevational view similar to FIG. 3 illustrating several dimensional features of the leveler.

Referring to FIG. 1, a conventional camper vehicle is shown generally at 10. An uneven ground surface 11 extends beneath the vehicle 10. A wheel 13 is shown elevated above the ground surface 11 to a height which will level the vehicle 10. A leveling device 20 constructed in accordance with the present invention is shown interposed between the ground surface 11 and the wheel 13 to effect the needed elevation of the wheel 13. A retaining block 40 is shown interposed between the forward end of the leveler 20 and the ground surface 11 to help retain the leveler 20 in position.

The leveling device 20 is a curved ramp-like structure which rocks as a wheel is driven over it. The procedure of elevating the wheel 13 through use of the leveling device 20 and the retaining block 40 is illustrated in FIGS. 2-5. The pointed forward end of the leveling device 20 is initially positioned adjacent the wheel 13 as shown in FIG. 2. The vehicle is then driven onto the leveling device 20 as shown in FIG. 3, to a position slightly beyond the position where the vehicle is level, as illustrated in FIG. 4. The retaining block 40 is then positioned beneath the forward end of the leveler 20 as shown in FIG. 4, and the wheel 13 is rolled back down the leveler 20 as required to seat the leveler 20 on the retaining block 40, as shown in FIG. 5. Removing the wheel 13 from the leveler 20 and the retainer 40 is a simple matter of reversing these steps.

Figure 10:
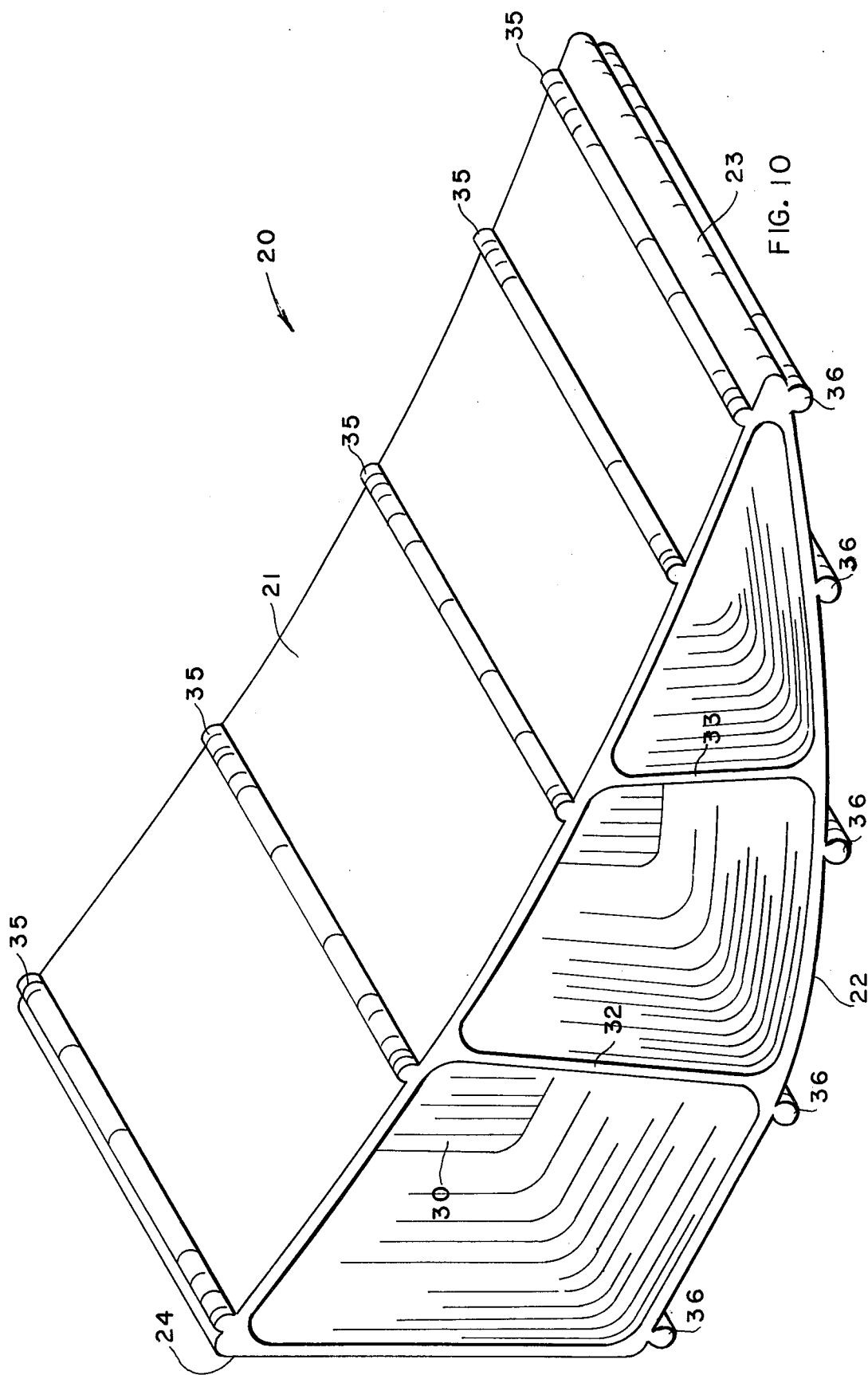
FIG. 10 is an enlarged perspective view of the leveling device.

Referring to FIGS. 6 and 10, the leveling device 20 is illustrated in greater detail as including an arcuate drive-on surface 21, an arcuate ground-engaging surface 22, a blunt-pointed front end 23 at the juncture of the surfaces 21, 22, and a planar rear surface 24 extending transversely of the surfaces 21, 22. The leveling device is preferably formed from cast metal such as ferrous or aluminum alloy. The leveler 20 has a central supporting web 30 together with integrally formed transversely extending webs 32, 33 to increase the strength and rigidity of the casting.

Lugs 35, 36 are provided along the surfaces 21, 22 respectively at spaced intervals to increase traction and minimize slippage.

The radius of curvature of the drive-on surface 21 is preferably substantially equal to or slightly greater than that of the wheel 13. In FIG. 6, the drive-on surface 21 is shown as having a radius of curvature 21R which is slightly greater than the radius 13R of the wheel 13. The ground-engaging surface 22 has a radius of curvature 22R which is substantially less than the radius 21R. The radius of curvature 22R of the ground-engaging surface 22 is preferably within the range of about 0.65 to 0.85 that of the radius of curvature 21R of the drive-on surface 21. In the preferred embodiment, the radius 22R is 0.75 that of the radius 21R.

The drive-on surface 21 is of a length L which is preferably between about 0.60 and 0.90 of the wheel radius 13R. The angle of intersection between the arcuate surfaces 21, 22 is preferably selected such that the "fully elevated height" H to which the leveler will raise a wheel is about one third of the length L of the drive-on surface. Such an arrangement typically enables a leveler to raise a wheel to a fully elevated height that is about 0.20 to 0.40 of the wheel radius as the wheel rotates through less than a quarter revolution.

As illustrated in FIG. 6, as the leveler 20 approaches its fully elevated position, the center of radius of the wheel 13 approaches closely to, but does not pass over, the center of radius of the ground-engaging surface 22. This arrangement assures that the forces exerted by the wheel 13 on the leveling device 20 will operate to maintain the engagement between the wheel 13 and the drive-on surface 21, thereby keeping the leveling device stable. The "fully elevated position" of the leveler 20 is defined as that position where the forward and rearward ends of the drive-on surface 21 are at approximately the same height. When the wheel 13 is supported in the fully elevated position atop the leveler 20, the wheel 13 rests stably in a trough defined by the drive-on surface 21.

Figure 9:
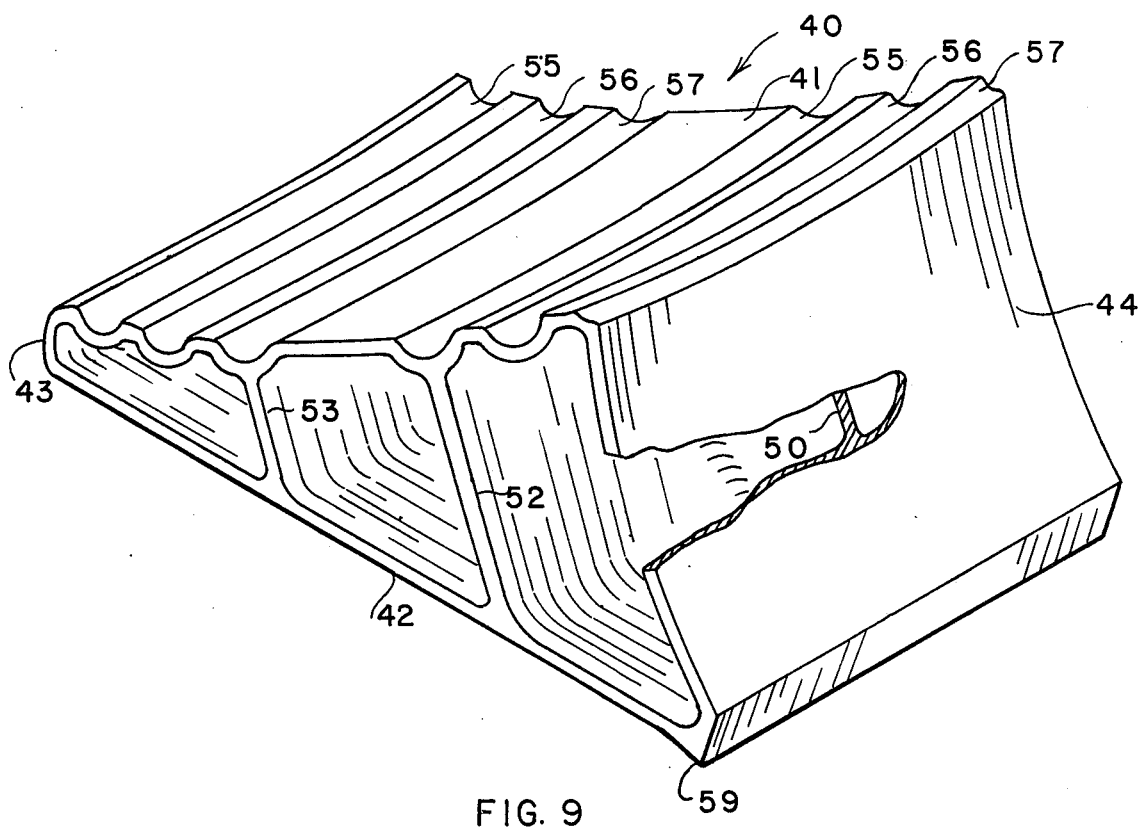
FIG. 9 is an enlarged perspective view of the retaining block.

Referring to FIG. 9, the retaining block 40 is a wedge-shaped structure having an inclined surface 41, a ground-engaging surface 42, a blunt-pointed front end 43 at the juncture of the surfaces 41, 42, and a rear surface 44 extending transversely of the surfaces 41, 42. The retaining block is preferably formed from molded plastic material. The retainer 40 has a central supporting web 50 together with integrally formed transversely extending webs 52, 53 to increase its strength and rigidity.

Three pairs of spaced grooves or depressions 55, 56, 57 extend transversely across the inclined surface 41. The pairs of grooves 55, 56, 57 are arranged to engage and mate with two of the ground engaging lugs 36 on the forward end region of the leveler 20 when the leveler 20 has rocked to an elevated position.

Referring to FIG. 7, the ground-engaging surface 22 of the leveler 20 is preferably slightly downwardly convex, having its lowest point beneath the web 30. Referring to FIG. 9, the inclined surface 41 of the retainer block 40 is slightly upwardly concave to mate with the convex ground-engaging surface 22 and to assist in maintaining alignment between the leveler 20 and the retainer 40.

A depending rib 59 is formed on the ground-engaging surface 42 of the retaining block 40 to minimize slippage of the retaining block.

Figure 11:
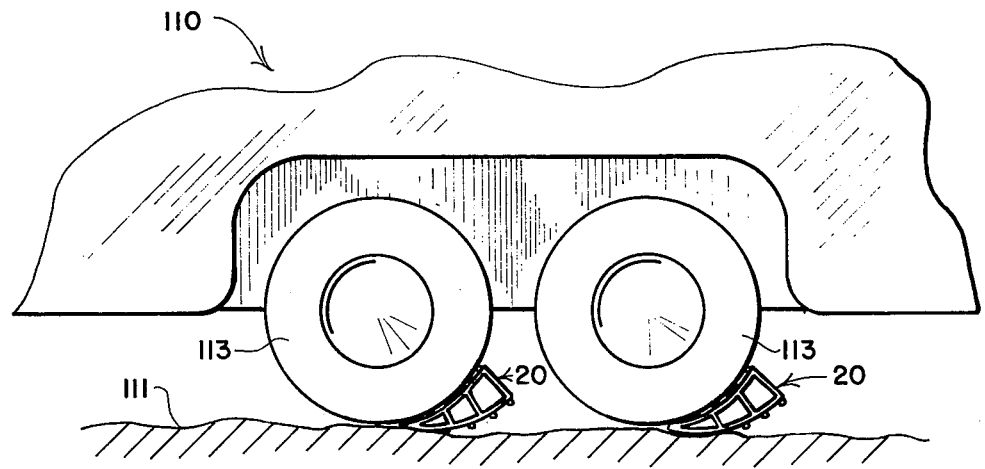
FIG. 11 is a side elevational view of a portion of a tandem wheeled vehicle with tandem wheels shown being driven onto a pair of leveling devices.

Referring to FIG. 11, a conventional tandem wheel camper vehicle is indicated generally by the numeral 110. An uneven ground surface 111 extends beneath the vehicle 110. The vehicle 110 includes a pair of relatively closely spaced, tandem wheels 113. As is shown in FIG. 11, leveling devices 20 constructed in accordance with the present invention are sufficiently short in length to permit their being used with tandem wheels. Previously proposed drive-on leveling devices have, of necessity due to their design, been of such length as prohibits their use with conventional closely spaced tandem wheels.

Figure 12:
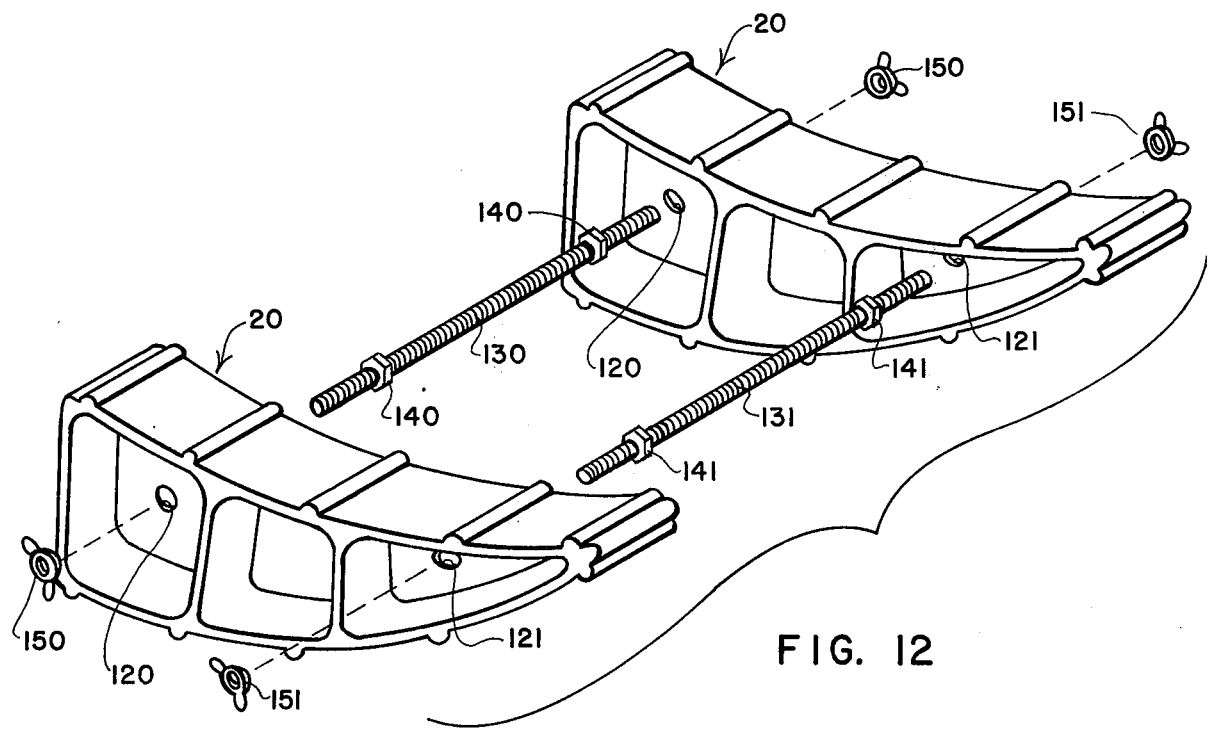
FIG. 12 is an exploded perspective view illustrating means for assembling a pair of leveling devices side-by-side for use with dual wheel vehicles.

Referring to FIG. 12, two leveling devices 20 may be rigidly supported in side-by-side relationship for use with dual wheels. Two holes 120, 121 are drilled through each of the central supporting webs 30. A first threaded rod 130 is inserted through the holes 120, and a second threaded rod 131 is inserted through the holes 121. Nuts 140, 141 are carried on central portions of the rods 130, 131 for engaging inner surfaces of the central supporting webs 30. Wing nuts 150, 151 are threaded onto end regions of the rods 130, 131 for engaging outer surfaces of the central supporting webs 30. By selecting the positions of the nuts 140, 141, 150, 151 along the rods 130, 131, the leveling devices 20 may be supported at any selected spacing for precise alignment with a particular set of dual wheels. A feature of the side-by side leveler mounting system shown in FIG. 12 is that it can easily be disassembled to permit individual use of the leveling devices 20.

From the foregoing description, it will be apparent that the present invention provides a leveling device of minimal length which rocks rapidly as a vehicle wheel is driven onto it to raise the wheel with a minimum of vehicle movement and to support the wheel safely in a cradle defined by the drive on surface.

Although the invention has been described in its preferred form with a certain degree of particularity, it is understood that the present disclosure of the preferred form has been made only by way of example and numerous changes in the details of construction and the combination and arrangement of parts may be resorted to without departing from the spirit and the scope of the invention as hereinafter claimed.

I claim:

1. A drive-on leveling device for elevating a vehicle wheel and maintaining the wheel in an elevated position, comprising:
    a. a ramp-like structure having forward and rearward ends, having a drive-on wheel-engaging surface, and having a ground engaging surface;
    b. the drive-on and ground engaging surfaces each extending substantially the full length of the structure between the ends, and each of the surfaces being arcuately curved along its full length;
    c. the drive-on and ground engaging surfaces intersecting to form a blunt-pointed forward end, and diverging one from the other along the full length of the structure as the surfaces extend away from the forward end;
    d. the ground engaging surface having a radius of curvature which is less than the radius of curvature of the drive-on surface, whereby the leveling device will rock as the wheel to be elevated is driven on the drive-on surface to elevate the wheel and provide a stable support; and
    e. the drive-on surface having a length which is less than the radius of the wheel to be elevated.

2. The leveling device of claim 1 wherein the drive-on and ground engaging surfaces diverge near the rearward end such that the leveling device is operable to elevate a wheel driven onto it by a height which is about one-third the length of the drive-on surface.

3. The leveling device of claim 1 wherein said radius of curvature of said ground engaging surface is within the range of approximately 0.65 to 0.85 the radius of curvature of said drive-on surface.

4. The leveling device of claim 1 wherein said radius of curvature of said drive-on surface is substantially equal to that of the wheel to be elevated, whereby the area of engagement between the wheel and the drive-on surface is maximized.

5. The leveling device of claim 1 wherein spaced traction lugs are provided along said ground engaging surface.

6. The leveling device of claim 1 additionally including means for releasably supporting a pair of the leveling devices in side-by-side relationship for use with dual wheels.

7. A drive-on leveling device for elevating a vehicle wheel and maintaining the wheel in an elevated position, comprising:
  a. a ramp-like structure having an arcuate ground engaging surface and an arcuate drive-on wheel-engaging surface;
  b. said surfaces intersecting to form a blunt-pointed forward end, and diverging one from the other along the full length of the structure in regions removed from said forward end;
  c. said ground engaging surface having a radius of curvature which is less than the radius of curvature of said drive-on surface whereby said leveling device will rock rapidly as the wheel to be elevated is driven onto said drive-on surface to elevate the wheel and provide a stable support;
  d. said ground engaging surface being provided with spaced traction lugs; and,
  e. wedge-shaped retaining means having an inclined surface provided with spaced grooves for mating with selected ones of said traction lugs to assist in retaining the leveling device in an elevated attitude.

8. The drive-on leveling device of claim 7 wherein spaced traction lugs are additionally provided along said drive on surface.

9. A drive-on leveling device for elevating a vehicle wheel and maintaining the wheel in an elevated position, comprising:
  a. a ramp-like structure having a forward end, a rearward end, and a pair of arcuately curved surfaces intersecting to form a blunt point at the forward end and diverging along their full length as they extend from the forward end to the rearward end;
  b. one of the arcuate surfaces being a wheel-engaging drive-on surface and having a length which is less than the radius of the vehicle wheel to be elevated by the device;
  c. the other of the arcuate surfaces being a ground engaging surface and having a radius of curvature which is less than the radius of curvature of the drive-on surface;
  d. the surfaces intersecting at the forward end at an angle which is selected such that when the leveling device is in a predetermined elevated position where both the forward and rearward ends of the drive-on surface extend substantially in a common horizontal plane, the leveling device will stably support a vehicle wheel atop the drive-on surface.

10. The device of claim 9 additionally including means for supporting a pair of the leveling devices in side-by-side relationship for use with dual wheels.

11. The device of claim 9 additionally including a retaining block having formations configured to mate with portions of the ground engaging surface when the leveling device is in the predetermined elevated position to assist in supporting the leveling device in the predetermined elevated position.

12. The device of claim 11 wherein the retaining block formations are also configured to mate with the portions when the leveling device is in a second predetermined elevated position to assist in supporting the leveling device in the second predetermined elevated position.

13. The drive-on leveling device of claim 9 wherein the drive-on surface has a length within the range of about 0.60 to 0.90 of the radius of the wheel to be elevated.

14. A drive-on leveling system for elevating a vehicle wheel and maintaining the wheel in an elevated position, comprising:
  a. a rockable ramp-like structure having forward and rearward ends and having an arcuate ground engaging surface and an arcuate drive-on wheel engaging surface which intersect at the forward end of the structure and which diverge one from the other along the length of the structure as they extend to the rearward end of the structure, the surfaces each being arcuate along substantially their entire lengths;
  b. said ground engaging surface having a radius of curvature which is less than the radius of curvature of said drive-on surface; and,
  c. a wedge-shaped retainer structure having an inclined surface configured to mate with forward portions of said ground engaging surface when said retainer structure is positioned beneath said forward portions.

15. The system of claim 14 wherein mating formations extending transversely of the line of juncture of said forward portions and said inclined surface are provided on said forward portions and said inclined surface.

16. The system of claim 15 wherein said mating formations include spaced projections on said ground engaging surface and mating depressions formed in said inclined surface.

17. The system of claim 14 wherein:
  a. said ramp-like structure is operable under the influence of a wheel driven onto said drive-on surface to rock to a fully elevated position where forward and rearward ends of said drive-on surface are at approximately the same height;
  b. said retainer structure is positionable under said forward portions where said ramp-like structure is in said fully elevated position to assist in retaining said ramp-like structure in said fully elevated position; and,
  c. mating formations are provided on the ramp-like structure and on the retainer structure which engage to releasably retain the structures in contact when the retainer structure is positioned under said forward portions.

18. The system of claim 14 wherein said forward portions of said ground engaging surface are downwardly convex in cross section, and said inclined surface is upwardly concave in cross section to mate with said forward portions.

* * * * *